US010694087B2

(12) United States Patent
Shigeta

(10) Patent No.: US 10,694,087 B2
(45) Date of Patent: Jun. 23, 2020

(54) OUTPUT APPARATUS, LENS APPARATUS, ADAPTOR APPARATUS, CAMERA APPARATUS, AND IMAGE PICKUP APPARATUS

(71) Applicant: CANON KABUSHIKI KAISHA, Tokyo (JP)

(72) Inventor: Junji Shigeta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/955,889

(22) Filed: Apr. 18, 2018

(65) Prior Publication Data

US 2018/0309914 A1    Oct. 25, 2018

(30) Foreign Application Priority Data

Apr. 20, 2017   (JP) .................................. 2017-083565

(51) Int. Cl.
| | |
|---|---|
| *H04N 5/225* | (2006.01) |
| *H04N 5/357* | (2011.01) |
| *H04N 5/217* | (2011.01) |
| *H04N 5/232* | (2006.01) |
| *G06K 9/00* | (2006.01) |

(Continued)

(52) U.S. Cl.
CPC ............. *H04N 5/2254* (2013.01); *G02B 7/04* (2013.01); *G02B 27/0037* (2013.01);
(Continued)

(58) Field of Classification Search
CPC .. H04N 5/2254; H04N 5/2178; H04N 5/3572; H04N 5/23209; H04N 5/2253;
(Continued)

(56) References Cited

U.S. PATENT DOCUMENTS

| | | |
|---|---|---|
| 8,638,388 B2 | 1/2014 | Natsume |
| 2004/0257454 A1* | 12/2004 | Pinto ....................... G06T 5/006 |
| | | 348/222.1 |

(Continued)

FOREIGN PATENT DOCUMENTS

| | | |
|---|---|---|
| JP | 2011041093 A | 2/2011 |
| JP | 2013197964 A | 9/2013 |

*Primary Examiner* — Albert H Cutler
(74) *Attorney, Agent, or Firm* — Rossi, Kimms & McDowell LLP

(57) ABSTRACT

Provided is output apparatus configured to output correction information on combinations each of which is a combination of a value of a parameter of an optical system and correction data corresponding to the value, the system forming an image to be picked up by a camera, the information being used for determining correction amount regarding optical characteristic of the optical system the output apparatus including: memory; and processor determining the correction information based on information regarding the camera, in which the processor determines, letting positive integers M and N satisfying M<N, the correction information when a number of combinations is M so as to include information on a combination of the value and the correction data that is not included in combinations of the correction information when a number of the combinations is N, and in which the memory stores the correction information obtained when the number is N.

30 Claims, 14 Drawing Sheets

(51) Int. Cl.
   *G02B 7/04* (2006.01)
   *G02B 27/00* (2006.01)
(52) U.S. Cl.
   CPC ....... *G06K 9/00604* (2013.01); *H04N 5/2178* (2013.01); *H04N 5/2253* (2013.01); *H04N 5/23209* (2013.01); *H04N 5/3572* (2013.01); *H04N 5/23212* (2013.01)
(58) Field of Classification Search
   CPC .. H04N 5/23212; H04N 5/2176; H04N 5/217; H04N 5/21; H04N 5/20; H04N 5/208; H04N 5/357; H04N 5/35721; H04N 5/365; H04N 5/3651; G06K 9/00604; G02B 27/0037; G02B 7/04; G02B 27/0068
   See application file for complete search history.

(56) References Cited

U.S. PATENT DOCUMENTS

| | | | |
|---|---|---|---|
| 2008/0062399 A1* | 3/2008 | Yoshida | G03G 15/5033 355/69 |
| 2008/0239099 A1* | 10/2008 | Abe | H04N 5/217 348/231.99 |
| 2008/0240709 A1* | 10/2008 | Nakamura | H04N 5/225 396/529 |
| 2013/0088636 A1* | 4/2013 | Inoue | G03B 13/36 348/346 |
| 2014/0198247 A1* | 7/2014 | Asano | G02B 7/282 348/357 |
| 2015/0049216 A1* | 2/2015 | Kano | H04N 5/23209 348/231.6 |

* cited by examiner

FIG.3

| | |
|---|---|
| Number of Focus Division Fnum | ⎫ Information on |
| Number of Zoom Division Znum | ⎬ Number of |
| Number of Iris Division Inum | ⎭ Division |
| Focus Division Point F [0] | |
| ... | |
| Focus Division Point F [Fnum-1] | |
| Zoom Division Point Z [0] | Information on |
| ... | Division Point |
| Zoom Division Point Z [Znum-1] | |
| Number of Iris Division I [0] | |
| ... | |
| Number of Iris Division I [Inum-1] | |
| 0-th Order Coefficient of Aberration Quantity Calculation Formula $P_0$ [0][0][0] | |
| First Order Coefficient of Aberration Quantity Calculation Formula $P_1$ [0][0][0] | |
| ... | |
| n-th Order Coefficient of Aberration Quantity Calculation Formula $P_n$ [0][0][0] | |
| 0-th Order Coefficient of Aberration Quantity Calculation Formula $P_0$ [1][0][0] | |
| First Order Coefficient of Aberration Quantity Calculation Formula $P_1$ [1][0][0] | Information on |
| ... | Coefficient of |
| n-th Order Coefficient of Aberration Quantity Calculation Formula $P_n$ [1][0][0] | Aberration Quantity |
| ... | Calculation Formula |
| 0-th Order Coefficient of Aberration Quantity Calculation Formula $P_0$ [Fnum-1][Znum-1][Inum-1] | |
| First Order Coefficient of Aberration Quantity Calculation Formula $P_1$ [Fnum-1][Znum-1][Inum-1] | |
| ... | |
| N-th Order Coefficient of Aberration Quantity Calculation Formula $P_1$ [Fnum-1][Znum-1][Inum-1] | |

Coefficients Necessary to Calculate Quantity of Chromatic Aberration of Magnification at Focus Division Point [0], Zoom Division Point[0], and Iris Division Point[0]

FIG.8A

| DI | | Ii0 | Ii1 | Ii2 | Ii3 |
|---|---|---|---|---|---|
| Fi0 | Zi0 | Pn[0][0][0] | Pn[0][0][1] | Pn[0][0][2] | Pn[0][0][3] |
| | Zi1 | Pn[0][1][0] | Pn[0][1][1] | Pn[0][1][2] | Pn[0][1][3] |
| | Zi2 | Pn[0][2][0] | Pn[0][2][1] | Pn[0][2][2] | Pn[0][2][3] |
| Fi1 | Zi0 | Pn[1][0][0] | Pn[1][0][1] | Pn[1][0][2] | Pn[1][0][3] |
| | Zi1 | Pn[1][1][0] | Pn[1][1][1] | Pn[1][1][2] | Pn[1][1][3] |
| | Zi2 | Pn[1][2][0] | Pn[1][2][1] | Pn[1][2][2] | Pn[1][2][3] |

FIG.8B

| Do | Fnum | Znum | Inum | Pn |
|---|---|---|---|---|
| Do1 | 2 | 3 | 4 | [Fi0,Fi1], [Zi0,Zi1,Zi2], [Ii0,Ii1,Ii2,Ii3] |
| Do2 | 2 | 3 | 3 | [Fi0,Fi1], [Zi0,Zi1,Zi2], [Ii0,Ii1,Ii3] |
| Do3 | 2 | 3 | 2 | [Fi0,Fi1], [Zi0,Zi1,Zi2], [Ii0,Ii3] |

FIG.9A

| Dc  | Fnum | Znum | Inum |
|-----|------|------|------|
| Dc1 | 2    | 3    | 4    |
| Dc2 | 2    | 3    | 3    |
| Dc3 | 2    | 3    | 2    |

FIG.9B

| Dc1 | | $I_1 0$ | $I_1 1$ | $I_1 2$ | $I_1 3$ |
|-----|-----|-----|-----|-----|-----|
| $F_1 0$ | $Z_1 0$ | Pn1[0][0][0] | Pn1[0][0][1] | Pn1[0][0][2] | Pn1[0][0][3] |
|         | $Z_1 1$ | Pn1[0][1][0] | Pn1[0][1][1] | Pn1[0][1][2] | Pn1[0][1][3] |
|         | $Z_1 2$ | Pn1[0][2][0] | Pn1[0][2][1] | Pn1[0][2][2] | Pn1[0][2][3] |
| $F_1 1$ | $Z_1 0$ | Pn1[1][0][0] | Pn1[1][0][1] | Pn1[1][0][2] | Pn1[1][0][3] |
|         | $Z_1 1$ | Pn1[1][1][0] | Pn1[1][1][1] | Pn1[1][1][2] | Pn1[1][1][3] |
|         | $Z_1 2$ | Pn1[1][2][0] | Pn1[1][2][1] | Pn1[1][2][2] | Pn1[1][2][3] |

FIG.9C

| Dc2 | | $I_2 0$ | $I_2 1$ | $I_2 2$ |
|-----|-----|-----|-----|-----|
| $F_2 0$ | $Z_2 0$ | Pn2[0][0][0] | Pn2[0][0][1] | Pn2[0][0][2] |
|         | $Z_2 1$ | Pn2[0][1][0] | Pn2[0][1][1] | Pn2[0][1][2] |
|         | $Z_2 2$ | Pn2[0][2][0] | Pn2[0][2][1] | Pn2[0][2][2] |
| $F_2 1$ | $Z_2 0$ | Pn2[1][0][0] | Pn2[1][0][1] | Pn2[1][0][2] |
|         | $Z_2 1$ | Pn2[1][1][0] | Pn2[1][1][1] | Pn2[1][1][2] |
|         | $Z_2 2$ | Pn2[1][2][0] | Pn2[1][2][1] | Pn2[1][2][2] |

FIG.9D

| Dc3 | | $I_3 0$ | $I_3 1$ |
|-----|-----|-----|-----|
| $F_3 0$ | $Z_3 0$ | Pn3[0][0][0] | Pn3[0][0][1] |
|         | $Z_3 1$ | Pn3[0][1][0] | Pn3[0][1][1] |
|         | $Z_3 2$ | Pn3[0][2][0] | Pn3[0][2][1] |
| $F_3 1$ | $Z_3 0$ | Pn3[1][0][0] | Pn3[1][0][1] |
|         | $Z_3 1$ | Pn3[1][1][0] | Pn3[1][1][1] |
|         | $Z_3 2$ | Pn3[1][2][0] | Pn3[1][2][1] |

FIG.10A

| DI | | Il0 | Il1 | Il2 | Il3 | Ix |
|---|---|---|---|---|---|---|
| Fl0 | Zl0 | Pn[0][0][0] | Pn[0][0][1] | Pn[0][0][2] | Pn[0][0][3] | Pn[0][0][4] |
| Fl0 | Zl1 | Pn[0][1][0] | Pn[0][1][1] | Pn[0][1][2] | Pn[0][1][3] | Pn[0][1][4] |
| Fl0 | Zl2 | Pn[0][2][0] | Pn[0][2][1] | Pn[0][2][2] | Pn[0][2][3] | Pn[0][2][4] |
| Fl1 | Zl0 | Pn[1][0][0] | Pn[1][0][1] | Pn[1][0][2] | Pn[1][0][3] | Pn[1][0][4] |
| Fl1 | Zl1 | Pn[1][1][0] | Pn[1][1][1] | Pn[1][1][2] | Pn[1][1][3] | Pn[1][1][4] |
| Fl1 | Zl2 | Pn[1][2][0] | Pn[1][2][1] | Pn[1][2][2] | Pn[1][2][3] | Pn[1][2][4] |

FIG.10B

| Dc | Fnum | Znum | Inum | Pn |
|---|---|---|---|---|
| Dc1 | 2 | 3 | 4 | [Fl0,Fl1]、[Zl0,Zl1,Zl2]、[Il0,Il1,Il2,Il3] |
| Dc2 | 2 | 3 | 3 | [Fl0,Fl1]、[Zl0,Zl1,Zl2]、[Il0,Il1,Ilx] |
| Dc3 | 2 | 3 | 2 | [Fl0,Fl1]、[Zl0,Zl1,Zl2]、[Il0,Il2] |

OUTPUT APPARATUS, LENS APPARATUS, ADAPTOR APPARATUS, CAMERA APPARATUS, AND IMAGE PICKUP APPARATUS

BACKGROUND OF THE INVENTION

Field of the Invention

The present invention relates to an output apparatus, a lens apparatus, an adaptor apparatus, a camera apparatus, and an image pickup apparatus.

Description of the Related Art

Digital cameras or other such image pickup apparatus are used for various purposes, and there is an increasing demand for higher image quality in images output from such image pickup apparatus. As one of the factors that hinder an increase in image quality of an image, there is image degradation due to optical characteristics of an image pickup lens used for imaging an object. Examples of the optical characteristics that cause image degradation include peripheral darkening, a distortion, and a chromatic aberration of magnification. Those optical characteristics differ depending on the optical system of a lens unit. In recent years, however, while there has been a demand for reduction in size of the lens unit, it is difficult to achieve an optical system from which those optical characteristics that cause image degradation are completely eliminated. Therefore, there is a technology (optical correction) for correcting such image degradation by image processing.

In Japanese Patent Application Laid-Open No. 2013-197964, there is proposed a lens unit, which is configured to retain data regarding optical characteristics (optical correction data) in the lens unit, and to transfer the optical correction data to an image pickup apparatus. Meanwhile, there is also proposed a method of determining, by the image pickup apparatus, a correction amount for image processing through use of the optical correction data and image pickup condition information on the lens unit. In this case, the image pickup condition is determined based on the optical parameters of optical adjustment members for the zoom, focus, and iris of the lens unit.

In Japanese Patent Application Laid-Open No. 2013-197964, there is also proposed a lens unit, which is configured to retain optical correction data for each of discretely formed image pickup conditions (reference image pickup conditions) instead of retaining optical correction data for all the image pickup conditions in the lens unit in order to reduce the size of the optical correction data. In this case, in image processing under an image pickup condition other than the image pickup conditions for which the lens unit retains the optical correction data, approximate interpolation is performed based on the optical correction data for the reference image pickup condition to determine a correction amount for the image processing.

In addition, in Japanese Patent Application Laid-Open No. 2011-41093, there is proposed an invention aiming at reduction in load of communication between a lens unit and an image pickup apparatus. Specifically, there is proposed a method involving selecting partial data from optical correction data retained by the lens unit depending on information regarding an image pickup element provided to the image pickup apparatus, and determining a correction amount for image processing through use of the selected partial data.

As the reference image pickup conditions, image pickup conditions and the number of image pickup conditions that are optimum for correcting image degradation are determined for a high resolution image pickup apparatus. Therefore, when a low resolution image pickup apparatus is mounted, optimum optical correction data is not always obtained by the method involving selecting partial data from the optical correction data and determining optical correction data for a low resolution. In other words, there exists such optical correction data for a low resolution as to reduce the error of the correction amount to a level lower than in the case of the selection of the partial data without changing the size of the optical correction data.

However, in the above-mentioned related arts disclosed in Japanese Patent Application Laid-Open No. 2013-197964 and Japanese Patent Application Laid-Open No. 2011-41093, it is possible to achieve the reduction in size of the optical correction data, but there is no description of determining optimum optical correction data with a limited data size.

SUMMARY OF THE INVENTION

The present invention provides, for example, an output apparatus advantageous in reduction in data size and highly accurate image correction.

According to one embodiment of the present invention, there is provided an output apparatus, which is configured to output correction information on combinations each of which is a combination of a value of a parameter of an optical system and correction data corresponding to the value, the optical system forming an image to be picked up by a camera apparatus, the information being used for determining a correction amount regarding an optical characteristic of the optical system, the output apparatus including: a memory; and a processor configured to determine the correction information based on information regarding the camera apparatus, in which the processor is configured to determine, letting M and N be positive integers that satisfy M<N, the correction information in a case where a number of the combinations is M so as to include information on a combination of the value and the correction data that is not included in combinations of the correction information in a case where a number of the combinations is N, and in which the memory stores the correction information in the case where the number of the combinations is N.

Further features of the present invention will become apparent from the following description of exemplary embodiments with reference to the attached drawings.

BRIEF DESCRIPTION OF THE DRAWINGS

FIG. 3 is a structure diagram of optical correction data.

FIG. 8A is a data structure table of the optical correction data Dl in terms of the n-th order coefficient Pn of the aberration quantity calculation formula in an embodiment of a related art.

FIG. 8B is a data structure table of the optical correction data Dl in terms of the n-th order coefficient Pn of the aberration quantity calculation formula in the embodiment of the related art.

FIG. 9A is a table for showing a first example of a data structure of the optical correction data Dl in terms of the n-th order coefficient Pn of the aberration quantity calculation formula in the first embodiment.

FIG. 9B is a table for showing the first example of the data structure of the optical correction data Dl in terms of the n-th order coefficient Pn of the aberration quantity calculation formula in the first embodiment.

FIG. 9C is a table for showing the first example of the data structure of the optical correction data Dl in terms of the n-th order coefficient Pn of the aberration quantity calculation formula in the first embodiment.

FIG. 9D is a table for showing the first example of the data structure of the optical correction data Dl in terms of the n-th order coefficient Pn of the aberration quantity calculation formula in the first embodiment.

FIG. 10A is a table for showing a second example of the data structure of the optical correction data Dl in terms of the n-th order coefficient Pn of the aberration quantity calculation formula in the first embodiment.

FIG. 10B is a table for showing the second example of the data structure of the optical correction data Dl in terms of the n-th order coefficient Pn of the aberration quantity calculation formula in the first embodiment.

DESCRIPTION OF THE EMBODIMENTS

Preferred embodiments of the present invention will now be described in detail in accordance with the accompanying drawings.

First Embodiment

Figure 1:
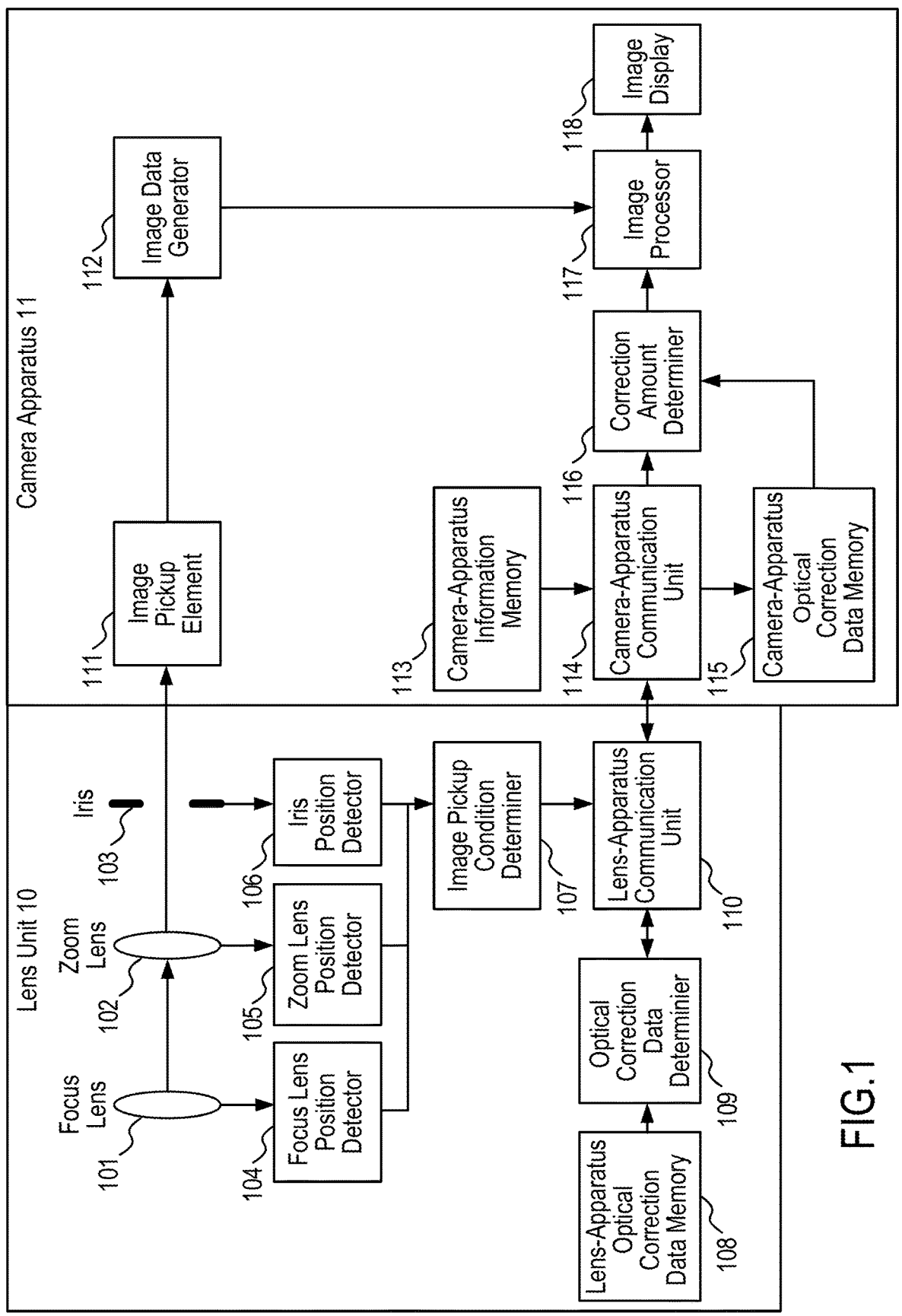
FIG. 1 is a configuration block diagram in a first embodiment of the present invention.

With reference to FIG. 1, a correction information output apparatus according to a first embodiment of the present invention is described below.

The description of the first embodiment is directed to a case in which optical correction is performed in order to correct a chromatic aberration of magnification.

FIG. 1 is a configuration block diagram in the first embodiment. In FIG. 1, a lens unit (lens apparatus and optical system) 10 is a lens unit configured to control a movable optical member relating to image pickup. A camera apparatus 11 is an image pickup apparatus configured to pick up an image, and is connected to the lens unit 10.

A focus lens 101 is a focus lens for focusing a picked-up image. A zoom lens 102 is a zoom lens for zooming the picked-up image. An iris 103 is an iris for adjusting a light amount of the picked-up image.

A focus lens position detector 104 is a focus lens position detector configured to detect the position of the focus lens. The zoom lens position detector 105 is a zoom lens position detector configured to detect the position of the zoom lens. An iris position detector 106 is an iris position detector configured to detect the position of the iris. For example, an absolute encoder is used as each of the focus lens position detector 104, the zoom lens position detector 105, and the iris position detector 106.

An image pickup condition determiner 107 is an image pickup condition determiner configured to determine an image pickup condition for the lens unit 10 from the result of detecting the position by each of the focus lens position detector 104, the zoom lens position detector 105, and the iris position detector 106. The image pickup condition represents, for example, a value obtained by normalizing each of a focus lens position, a zoom lens position, an iris position within a movable range thereof.

A lens optical correction data memory 108 is a data memory configured to retain optical correction data (basic data), and is a non-volatile memory, for example, a flash ROM memory. In this case, the optical correction data is data to be used for calculating a magnification chromatic aberration quantity ascribable to the optical characteristics of the lens unit 10.

An optical correction data determiner 109 is an optical correction data determiner configured to determine optical correction data to be sent to the camera apparatus 11 in accordance with the camera apparatus 11. A lens-apparatus communication unit 110 is a communication unit configured to communicate to/from the camera apparatus 11.

The image pickup condition determiner 107, the optical correction data determiner 109, and the lens-apparatus communication unit 110 are provided inside, for example, a CPU within the lens unit 10.

An image pickup element 111 is an image pickup element configured to receive an optical image formed by the lens unit to pick up an image as a picked-up image, and is, for example, a CMOS image sensor. An image data generator 112 is an image data generator configured to generate picked-up image data.

A camera information memory 113 is a data memory configured to retain the camera information. In this case, the camera information (image pickup apparatus information) represents the size of data that can be retained by a camera optical correction data memory 115 (that is available for correction processing), the image size, number of effective pixels, and permissible circle of confusion of the image pickup element 111, and other such information relating to a camera apparatus. A camera-apparatus communication unit 114 is a communication unit configured to communicate to/from the lens unit 10. The camera optical correction data memory 115 is a data memory configured to retain the optical correction data of the lens unit 10, and is a non-volatile memory, for example, a flash ROM memory. A correction amount determiner 116 determines a correction amount from the optical correction data and the image pickup condition. An image processor (image processing unit) 117 is an image processor configured to perform image processing on the picked-up image.

The image data generator 112, the camera information memory 113, the camera-apparatus communication unit 114, the correction amount determiner 116, and the image processor 117 are provided inside, for example, a CPU within the camera apparatus 11.

An image display 118 is an image display configured to display an image picked up by the camera apparatus 11, and is, for example, a liquid crystal monitor.

In the first embodiment, light that has entered the lens unit 10 is output as an image subjected to optical correction in accordance with the following flow.

The light that has entered the lens unit 10 passes through the focus lens 101, the zoom lens 102, and the iris 103 to be imaged on the image pickup element 111, and is converted into an electric signal to be output from the image data generator 112 to the image processor 117 as image data before optical correction.

The image processor 117 subjects the image data before optical correction to image processing based on an optical correction amount Rr determined by the correction amount determiner 116, and outputs the resultant to the image display 118 as image data after optical correction. In the above-mentioned manner, an image obtained by correcting a magnification chromatic aberration quantity Er ascribable to the optical characteristics of the lens unit 10 is displayed on the image display 118.

Next, a series of processing steps performed on the camera apparatus 11 side, in which the correction amount determiner 116 determines the optical correction amount Rr, is described with reference to FIG. 2. Processing performed on the lens unit 10 side is described later.

When the lens unit 10 is connected to the camera apparatus 11 and the camera apparatus 11 is powered on, the procedure advances from Step S201 to Step S202 to start an operation in the first embodiment. In this case, the lens unit 10 is configured to be supplied with power via a contact (not shown) with the camera apparatus 11, and hence, when the camera apparatus 11 is powered on, the lens unit 10 is simultaneously supplied with power to be activated.

When the procedure advances to Step S202, the camera information memory 113 sends the camera information (image pickup apparatus information) to the lens unit 10 via the camera-apparatus communication unit 114, and the procedure advances to Step S203.

When the procedure advances to Step S203, the camera-apparatus communication unit 114 receives optical correction data Dc for the camera apparatus 11 from the lens unit 10, and the procedure advances to Step S204.

In this case, as illustrated in FIG. 3, the optical correction data Dc includes information on the number of division, division point information, information on a coefficient of an aberration quantity calculation formula.

The information on the number of division represents a number into which the focus lens position, the zoom lens position, and the iris position, which are optical parameters, are freely divided within the movable range.

The division point information represents positions at which the focus lens position, the zoom lens position, and the iris position are freely divided within the movable range. For example, when the number of focus division, the number of zoom division, and the number of iris division are Fnum, Znum, and Inum, respectively, the number of focus division points, the number of zoom division points, and the number of iris division points are Fnum, Znum, and Inum, respectively.

The information on the coefficient of the aberration quantity calculation formula represents coefficients of a multidimensional formula for calculating the magnification chromatic aberration quantity Er with respect to an image height (optical parameter) h in an image of another color (R image) with an image of a given color (G image) being used as a reference. When the magnification chromatic aberration quantity of an image of another color (magnification chromatic aberration quantity of a B image with the G image being used as a reference) is calculated, another coefficient of the aberration quantity calculation formula is required, but the basic flow is the same, and hence the detailed description thereof is omitted.

In this case, assuming that, for example, the number of focus division, the number of zoom division, and the number of iris division are Fnum, Znum, and Inum, respectively, and the highest order of the multidimensional formula is n, the number of coefficients of the aberration quantity calculation formula is (n+1)×Fnum×Znum×Inum. The magnification chromatic aberration quantity Er with respect to the image height h is as expressed in Formula 1. In Formula 1, $P_0$, $P_1$, and Pn represent the 0-th, first, and n-th order coefficients of the aberration quantity calculation formula, respectively.

$$Er = P_0 + (P_1 \times h^1) + \ldots + (Pn \times h^n) \quad (1)$$

When the procedure advances to Step S204, the camera optical correction data memory 115 internally records the optical correction data Dc for the camera apparatus 11 received in Step S203, and the procedure advances to Step S205.

When the procedure advances to Step S205, the camera-apparatus communication unit 114 receives the current image pickup condition from the lens unit 10, and the procedure advances to Step S206.

When the procedure advances to Step S206, the correction amount determiner 116 determines the optical correction amount Rr based on the current image pickup condition received in Step S205 and the optical correction data Dc for the camera apparatus 11 recorded in the camera optical correction data memory 115.

Specifically, an approximate correction formula coefficient for the image pickup condition is determined from correction formula coefficients for the focus division point, the zoom division point, and the iris division point, which are close to the current image pickup condition acquired in Step S205, through linear interpolation (interpolation processing) between dividing points, and Formula 1 is used to determine the magnification chromatic aberration quantity Er.

Then, such an optical correction amount Rr as to cancel the determined magnification chromatic aberration quantity Er is determined. Specifically, the minus value of the magnification chromatic aberration quantity Er is set as the optical correction amount Rr.

After that, Step S205 and Step S206 are successively executed, to thereby be able to continue to determine the optical correction amount Rr to be applied to the image data before optical correction.

Figure 2:
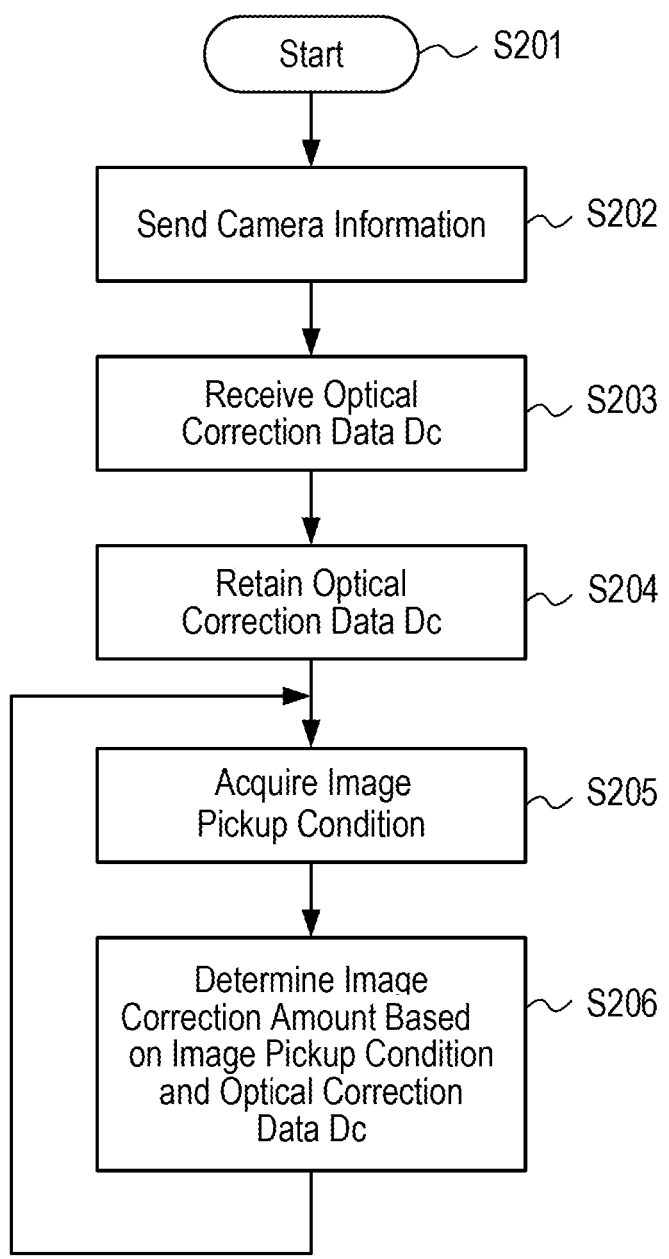
FIG. 2 is an operation flow chart of a camera apparatus 11 according to the first embodiment.

Next, a series of processing steps performed on the lens unit 10 side with respect to the processing of FIG. 2 is described with reference to FIG. 4.

Figure 4:
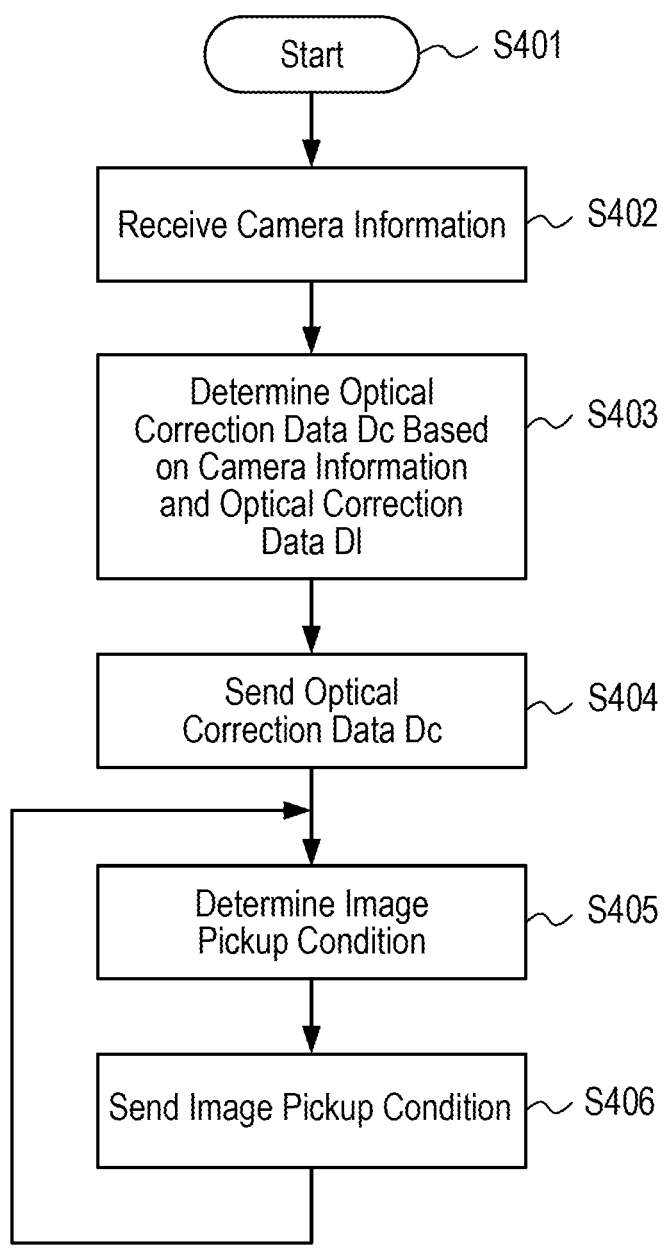
FIG. 4 is an operation flow chart of a lens unit 10 in the first embodiment.

FIG. 4 is an illustration of the flow of the series of processing steps performed on the lens unit 10 side with respect to the processing of FIG. 2 in the first embodiment.

When the procedure advances from Step S201 to Step S202, the lens unit 10 is also powered on, and the procedure advances from Step S401 to Step S402 to start the operation of the lens unit 10 of the first embodiment.

When the procedure advances to Step S402, the lens-apparatus communication unit 110 receives the camera information sent from the camera apparatus 11 in Step S202, and the procedure advances to Step S403.

When the procedure advances to Step S403, the optical correction data determiner 109 determines the optical correction data Dc for the camera apparatus 11 based on the camera information received in Step S402 and optical correction data Dl retained by the lens optical correction data memory 108, and the procedure advances to Step S404. A method of determining the optical correction data Dc for the camera apparatus 11 is described later.

When the procedure advances to Step S404, the optical correction data determiner 109 sends the optical correction data Dc for the camera apparatus 11 determined in Step S403 to the camera apparatus 11 via the lens-apparatus communication unit 110, and the procedure advances to Step S405.

When the procedure advances to Step S405, the image pickup condition determiner 107 determines the image pickup condition for the lens unit 10 from the result of detecting the position by each of the focus lens position detector 104, the zoom lens position detector 105, and the iris position detector 106, and the procedure advances to Step S406.

When the procedure advances to Step S406, the image pickup condition determiner 107 sends the current image pickup condition determined in Step S405 to the camera apparatus 11 via the lens-apparatus communication unit 110.

After that, Step S405 and Step S406 are successively executed, to thereby be able to continue to send the current image pickup condition, which is required for the calculation of the optical correction amount Rr to be applied, to the camera apparatus 11.

In the above-mentioned manner, it is possible to send the optical correction data Dc and the current image pickup condition from the lens unit 10 to the camera apparatus 11.

With the above-mentioned operations of the camera apparatus 11 and the lens unit 10, the optical correction amount Rr is determined, and such an image as to cancel the magnification chromatic aberration quantity Er is displayed on the image display 118.

Next, a method of determining the optical correction data Dc for the camera apparatus 11, which is a feature of the present invention, is described.

Figure 5A:
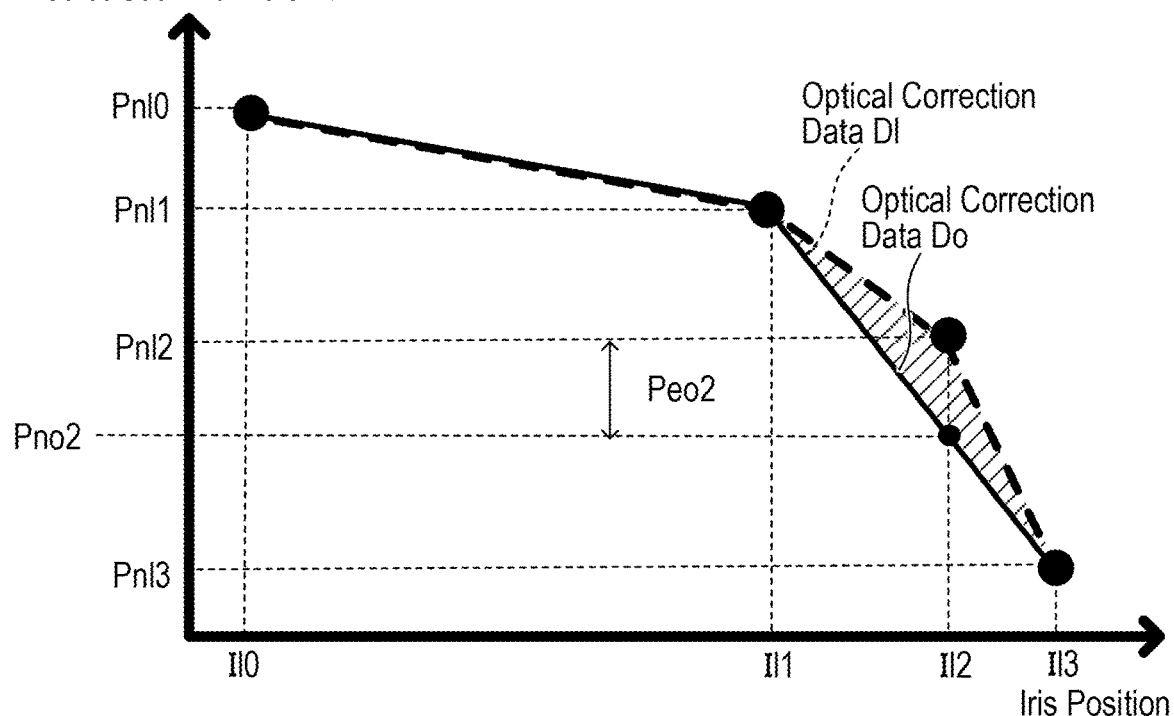
FIG. 5A is a graph for showing a relationship among optical correction data Dl, optical correction data Do, and optical correction data Dc in terms of an n-th order coefficient Pn of an aberration quantity calculation formula.

FIG. 5A is a graph for showing a relationship between the n-th order coefficient Pn of the aberration quantity calculation formula and the iris position on each of the optical correction data Dl and optical correction data Do. The optical correction data Do is the optical correction data of the camera apparatus 11 determined through thinning-out being a related art. In FIG. 5A, there is shown a case in which the optical correction data. Do has a smaller number of iris division by one than the number Inum of iris division of the optical correction data Dl due to the small size of data that can be retained by the camera optical correction data memory 115.

In FIG. 5A, the vertical axis represents the n-th order coefficient Pn of the aberration quantity calculation formula, and the horizontal axis represents the iris position.

In FIG. 5A, there is shown a case in which a focus position and a zoom position are fixed at freely-set division point positions, and the number Inum of iris division of the optical correction data Dl is 4.

In FIG. 5A, Il0 to Il3 represent the respective positions of the iris division points on the optical correction data Dl, and Pnl0 to Pnl3 represent the respective values of the n-th order coefficients Pn of the aberration quantity calculation formula at the iris division points Il0 to Il3. The optical correction data Do represents the optical correction data obtained by thinning out the division point Il2 from the optical correction data Dl. At this time, the number Inum of iris division of the optical correction data Do is 3.

The n-th order coefficient Pn of the aberration quantity calculation formula at an iris position different from the division point is calculated by linear approximation from the n-th order coefficients Pn of the aberration quantity calculation formula at the adjacent iris division points. Therefore, the relationship between the n-th order coefficient Pn of the aberration quantity calculation formula and the iris position on the optical correction data DI is as indicated by the dotted line in FIG. 5A. In the same manner, the relationship between the n-th order coefficient Pn of the aberration quantity calculation formula and the iris position on the optical correction data Do is as indicated by the solid line in FIG. 5A.

In FIG. 5A, the hatched portion indicates a difference at each iris position between the n-th order coefficients Pn of the aberration quantity calculation formula on the optical correction data. Dl and the optical correction data Do. As the hatched portion becomes smaller and as the maximum value of the differences between the n-th order coefficients Pn of the aberration quantity calculation formula on the optical correction data Dl and the optical correction data Do over the entire range of the iris positions Il0 to Il3 becomes smaller, a difference between the magnification chromatic aberration quantity Er calculated by Formula 1 and the magnification chromatic aberration quantity of the image data after optical correction becomes smaller. In short, accuracy in correction of the chromatic aberration of magnification becomes higher.

It is understood from FIG. 5A that, due to the thinning-out of the division point Il2, a difference Peo2 between the n-th order coefficient Pnl2 of an aberration quantity correction formula on the optical correction data Dl at Il2 and an n-th order coefficient Pno2 for the aberration quantity correction formula on the optical correction data Do is large. In the case where the difference Peo2 is large, when the magnification chromatic aberration quantity is calculated through use of the optical correction data Do at Il2, the difference between the magnification chromatic aberration quantity Er calculated by Formula 1 and the magnification chromatic aberration quantity of the image data after optical correction may exceed the permissible circle of confusion in some cases. This leaves the chromatic aberration of magnification in the image data after optical correction, which inhibits the optical correction from being performed sufficiently.

Figure 5B:
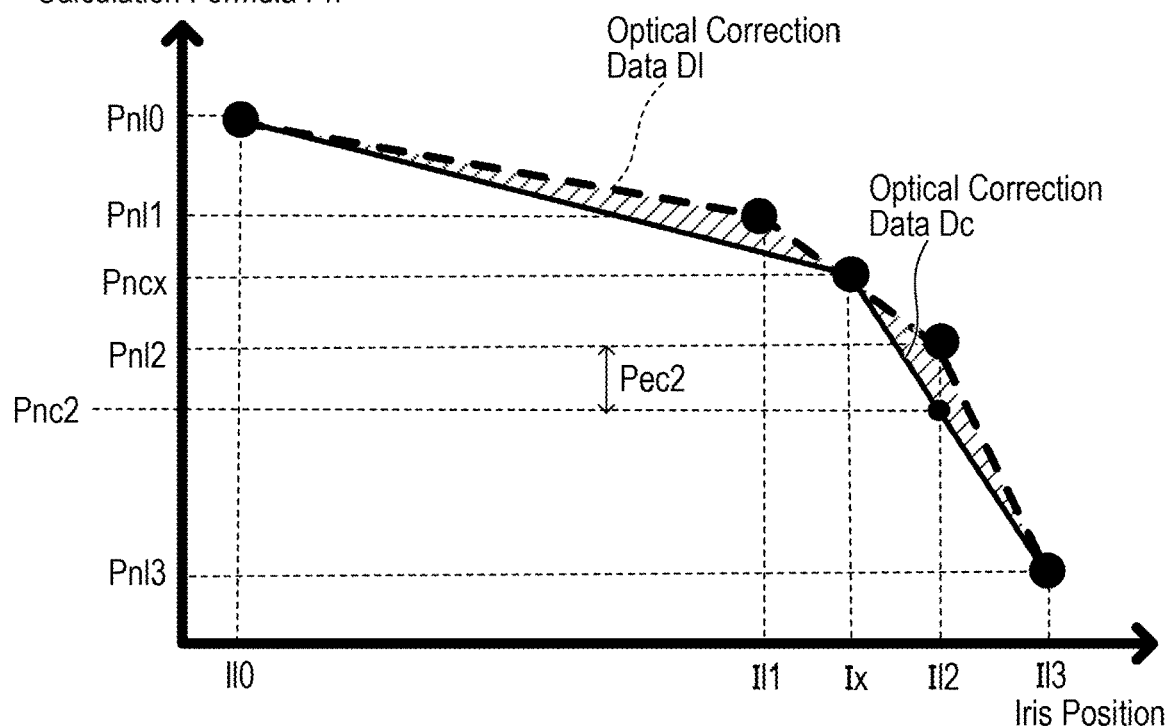
FIG. 5B is a graph for showing a relationship among the optical correction data Dl, the optical correction data Do, and the optical correction data Dc in terms of the n-th order coefficient Pn of the aberration quantity calculation formula.

FIG. 5B is a graph for showing a relationship between the n-th order coefficient Pn of the aberration quantity calculation formula and the iris position on each of the optical correction data Dl and the optical correction data Dc. The optical correction data Dc is the optical correction data of the camera apparatus 11 to which the first embodiment is applied.

In FIG. 5A, in order to reduce the optical correction data, the division point Il2 is thinned out from the optical correction data Do. Meanwhile, FIG. 5B differs from FIG. 5A in that Ix is newly set on the optical correction data Dc in place of Il1 and Il2. At this time, the n-th order coefficient Pn of the aberration quantity calculation formula at Ix is Pncx. In this case, the iris division points on the optical correction data Dc are Il0, Ix, and Il3, and hence the number Inum of iris division is 3, which is the same as the number Inum of iris division of the optical correction data Dl.

It is understood from FIG. 5B that a difference Pec2 between the n-th order coefficient Pnl2 of the aberration quantity correction formula on the optical correction data Dl at Il2 and an n-th order coefficient Pnc2 of the aberration quantity correction formula on the optical correction data Dc at Il2 is smaller than Peo2 of FIG. 5A. It is also understood from FIG. 5B that the maximum value of differences at Il0 to Il3 between the n-th order coefficients Pn of the aberration quantity calculation formula on the optical correction data Dl and the optical correction data Dc is small. The correction amount determiner determines M iris positions so as to minimize the maximum value (Pec2) of the differences between the correction amount (for example, Pnc2) obtained based on the determined optical correction data Dc and the basic data (for example, Pnl2) stored as the optical correction data Dl at N iris positions, which are more than M iris positions. In short, the optical correction data Dc is data that enables the chromatic aberration of magnification to be corrected with higher accuracy than in the case of the optical correction data Do even with the same data amount.

In this case, as data counts of the optical correction data Dc, the number of focus division, the number of zoom division, and the number of iris division are determined based on a data size Dmax of the camera information that can be retained by the camera optical correction data memory 115 so that the size of the optical correction data Dc falls within the data size Dmax. There may be employed another method of uniquely determining the size of the optical correction data Dc from the image size and number of effective pixels of the image pickup element 111.

Next, a specific example of determining the division point and the coefficient of an aberration correction formula is described with reference to FIG. 6.

Figure 6:
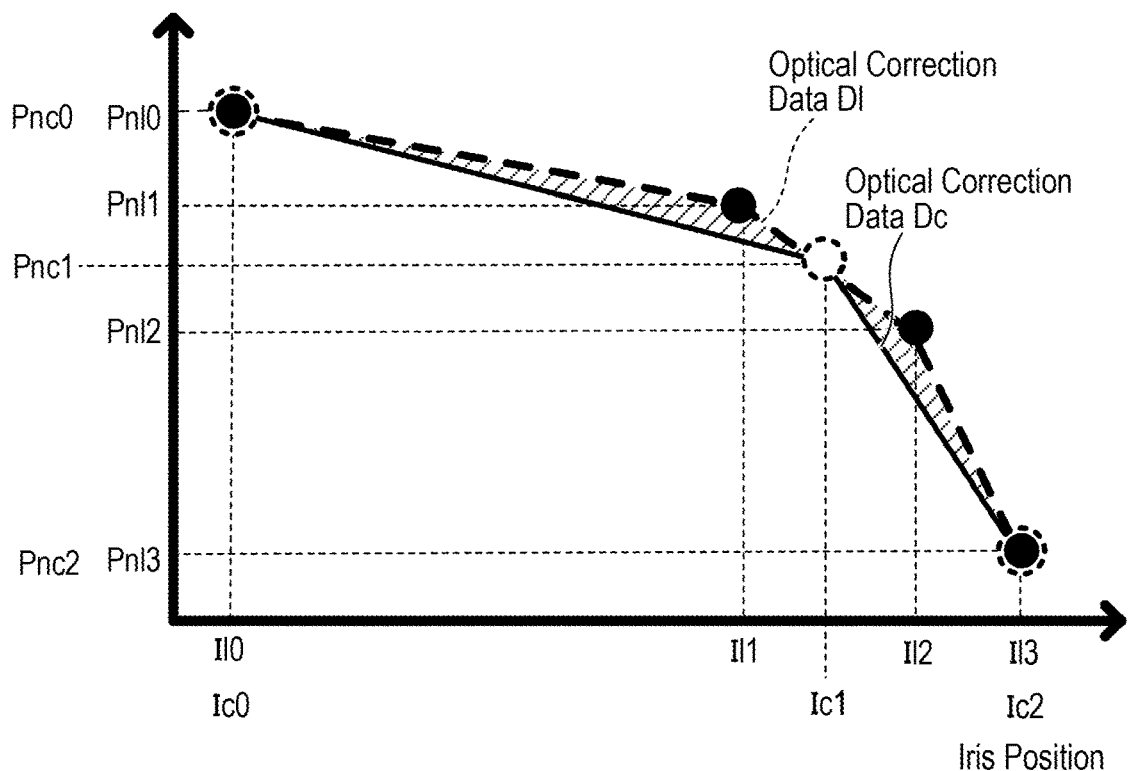
FIG. 6 is a graph for showing a method of determining an iris division point for the n-th order coefficient Pn of the aberration quantity calculation formula on the optical correction data Dc.

FIG. 6 is a graph for showing a relationship between the iris division point and the n-th order coefficient Pn of the aberration quantity calculation formula exhibited when it is required to reduce the number of iris division by one in order to reduce the data size of the optical correction data Dc so as to become smaller than the optical correction data Dl.

The vertical axis and the horizontal axis of FIG. 6 are the same as those of FIG. 5B.

The values of the same symbols shown in FIG. 6 and FIG. 5B indicate the same values.

In FIG. 6, Ic0, Ic1, and Ic2 represent iris division points on the optical correction data Dc, and Pnc0, Pnc1, and Pnc2 represent the values of the n-th order coefficients Pn of the aberration quantity calculation formula at Ic0, Ic1, and Ic2, respectively.

It is required to reduce the number Inum of iris division from 4 to 3, and hence it is required to determine three iris division points. Therefore, the iris division points Ic0, Ic1, and Ic2 less than Il0 to Il3 by one are changed to determine the iris division points Ic0, Ic1, and Ic2 at which the maximum value of differences between the n-th order coefficients Pn of the aberration quantity calculation formula on the optical correction data Dl and the optical correction data Dc is the smallest. This processing is performed on all order numbers, and Ic0, Id1, and Ic2 are finally determined so that the difference between the magnification chromatic aberration quantities Er calculated by Formula 1 from the optical correction data Dl and the optical correction data Dc is the smallest. After that, all order coefficients of the aberration quantity calculation formula at Ic0, Ic1, and Ic2, which have been determined, are determined.

In this example, Ic0 and Ic2 have the same values as those of Il0 and Il3, respectively, and Pnc0 and Pnc2 being the n-th order coefficients Pn of the aberration quantity calculation formula have the same values as those of Pnl0 and Pnl3, respectively. Further, a new iris division point Ic1 is set in place of Il1 and Il2, and Pnc1 being the n-th order coefficient Pn of the aberration quantity calculation formula at Ic1 is determined through the linear interpolation of the optical correction data Dl.

That is, assuming that M and N are integers that satisfy M<N, the optical correction data (correction information) is determined by the optical correction data determiner (correction information determination unit) so that optical correction data obtained when the number of iris division (plurality of positions) is M includes information excluded in optical correction data obtained when the number of iris division is N. In the example shown in FIG. 6, the excluded information is correction information including an iris position (position Ic1) and correction data (n-th order coefficient Pnc1 of the aberration quantity calculation formula). The optical correction data may be determined by the optical correction data determiner so that the optical correction data obtained when the number of iris division is M further includes information included in the optical correction data obtained when the number of iris division is N.

Figure 7:
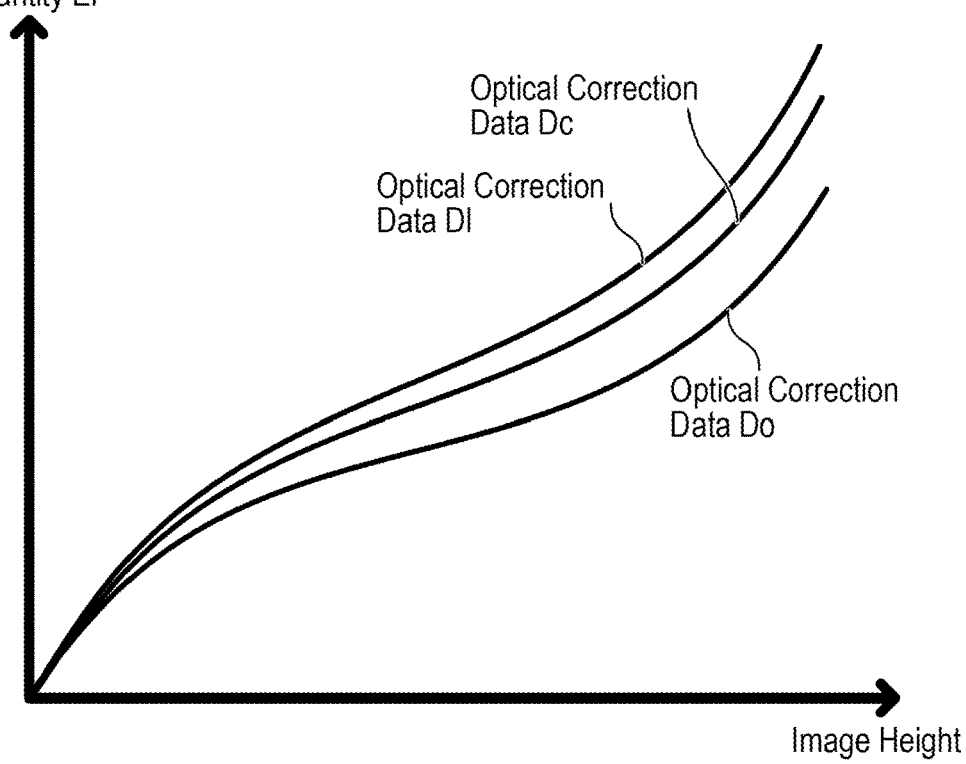
FIG. 7 is a graph for showing a relationship among magnification chromatic aberration quantities Er calculated from the optical correction data Dl, the optical correction data Do, and the optical correction data Dc.

FIG. 7 is a graph for showing a relationship between the magnification chromatic aberration quantity Er and the image height h at the iris position Il2 on each of the optical correction data Dl, the optical correction data Do, and the optical correction data Dc.

In FIG. 7, the horizontal axis represents the image height h, and indicates that the image height h becomes higher as the position becomes closer to the right side of the drawing sheet.

The vertical axis represents the magnification chromatic aberration quantity Er, and indicates that the magnification chromatic aberration quantity Er becomes larger as the position becomes closer to the upper side of the drawing sheet.

In this case, the magnification chromatic aberration quantity Er has a value calculated through use of Formula 1 based on the 0-th to n-th order coefficients of the aberration quantity calculation formula determined from each of the optical correction data Dl, the optical correction data Do, and the optical correction data Dc.

It is also understood from FIG. 7 that the value of the magnification chromatic aberration quantity Er determined from the optical correction data Dc is closer to the value of the magnification chromatic aberration quantity Er determined from the optical correction data Dl than to the value of the magnification chromatic aberration quantity Er determined from the optical correction data Do. In short, the optical correction data Dc is higher in correction accuracy for the magnification chromatic aberration quantity than the optical correction data Do.

Next, a data structure of the optical correction data Dl retained by the lens optical correction data memory 108 is described.

In FIG. 8A and FIG. 8B, the data structure of the optical correction data Dl used when the thinning-out being the related art is performed is shown.

In FIG. 8A, a table structure for showing a relationship between the n-th order coefficient Pn of the aberration quantity calculation formula and each division point on the optical correction data Dl is shown.

In the table structure of FIG. 8A, a data array of the n-th order coefficients Pn of the aberration quantity calculation formula obtained when the number Fnum of focus division, the number Znum of zoom division, and the number Inum of iris division are 2, 3, and 4, respectively is shown. In FIG. 8A, Pn[a][b][c] (where a, b, and c each represent a freely-selected numerical value) represents the n-th order coefficient Pn of the aberration quantity calculation formula at each division point. In Pn[a][b][c], a, b, and c represent the indices of the focus division point, the zoom division point, and the iris division point, respectively. For example, Pn[0][1][2] represents the value of the n-th order coefficient Pn of the aberration quantity calculation formula at a focus division point Fl0, a zoom division point Zl1, and an iris division point Il2.

The same structure applies to coefficients of other orders of the aberration quantity calculation formula, and hence the description of coefficients of other orders is omitted.

FIG. 8B is a table for showing information on the numbers of division for each type of the optical correction data Do and information on the division points formed for the n-th order coefficients Pn of the aberration quantity calculation formula.

In the table, the column of Do indicates the type of the optical correction data Do, and in this example, Do1 to Do3 exist as the types of the optical correction data Do. In the columns of Fnum, Znum, and Inum, the numbers of division on the optical correction data Do of each of Do1 to Do3 are written. The column of Pn indicates the division points formed for the n-th order coefficient Pn of the aberration quantity calculation formula on each of Do1 to Do3. In addition, the division points written in the column of Pn decrease in number as the data amount decreases in the order of Do1, Do2, and Do3 so that the division points on Do2 are obtained by deleting Il2 from the division points on Do1 and the division points on Do3 are obtained by deleting Il1 from the division points on Do2.

For example, Do2 indicated by the hatched portion is selected when the lens unit 10 determines that the camera apparatus 11 can support the optical correction data having a data size equal to or larger than such a data size that the number Fnum of focus division, the number Znum of zoom division, and the number Inum of iris division are 2, 3, and 3, respectively. At this time, as written in the column of Pn for Do2, the n-th order coefficients Pn of the aberration quantity calculation formula and the division points formed on the optical correction data Do2 have the values included in the hatched portion of FIG. 8A.

Next, the data structure of the optical correction data Dl in the first embodiment are described with reference to FIG. 9A to FIG. 9D, FIG. 10A, and FIG. 10B.

As a method of generating the optical correction data Dc, the related-art optical correction data Dl shown in FIG. 8A may be retained, and the optical correction data Dc may be generated by a method described with reference to FIG. 6 when the camera information is determined. However, in consideration of a processing time to be required by the lens unit 10, there may be employed a method involving determining the optical correction data Dc by retaining the optical correction data Dc that can support a plurality of camera apparatus 11 in the lens optical correction data memory 108 in advance and selecting the optical correction data Dc depending on the camera information.

FIG. 9A to FIG. 9D, FIG. 10A, and FIG. 10B are tables for showing examples of the data structure of the optical correction data Dl in the case where the optical correction data Dc that can support a plurality of camera apparatus 11 is retained in the lens optical correction data memory 108 in advance.

In FIG. 9A to FIG. 9D, an example of the data structure of the optical correction data Dl for achieving the first embodiment is shown.

In FIG. 9A, information on the numbers of division for each type of the optical correction data Dc is shown.

In this example, Dc1 to Dc3 exist as the types of the optical correction data Dc. In the columns of Fnum, Znum, and Inum, the numbers of division on the optical correction data Do of each of Dc1 to Dc3 are written.

In FIG. 9B, FIG. 9C, and FIG. 9D, relationships between the n-th order coefficients Pn of the aberration quantity calculation formula and the respective division points on Dc1, Dc2, and Dc3 being the types of the optical correction data Dc are shown. In this case, $F_1 1$, $F_1 1$, $F_2 0$, $F_2 1$, $F_3 0$, and $F_3 1$ each represent a focus division point, $Z_1 0$ to $Z_1 2$, $Z_2 0$ to $Z_2 2$, and $Z_3 0$ to $Z_3 2$ each represent a zoom division point, and $I_1 0$ to $I_1 3$, $I_2 0$ to $I_2 2$, and $I_3 0$ to $I_3 1$ each represent an iris division point. In addition, Pn1[a][b][c], Pn2[a][b][c], and Pn3[a][b][c] (where a, b, and c each represent a freely-selected numerical value) each represent the n-th order coefficient Pn of the aberration quantity calculation formula at each division point.

The lens optical correction data memory 108 retains the tables of FIG. 9A and FIG. 9B, FIG. 9C, FIG. 9D as the optical correction data Dl. The optical correction data determiner 109 determines the optical correction data Dc that satisfies the data size of the optical correction data Dc based on the camera apparatus 11 and the table of FIG. 9A. In addition, the data of a corresponding one of FIG. 9B, FIG. 9C, and FIG. 9D is employed as the optical correction data Dc.

For example, Dc2 indicated by the hatched portion of FIG. 9A is selected when the optical correction data determiner 109 determines that the camera apparatus 11 can support the optical correction data having a data size equal to or larger than such a data size that Fnum, Znum, and Inum being the numbers of division are 2, 3, and 3, respectively. At this time, the data shown in FIG. 9C is determined as the optical correction data Dc.

Therefore, as compared to the data structure of the related-art optical correction data Dl shown in FIG. 8A and FIG. 8B, degrees of freedom in each division point and each n-th order coefficient Pn of the aberration quantity calculation formula become larger, and it is possible to determine the optical correction data Dc that enables the chromatic aberration of magnification to be corrected with higher accuracy.

FIG. 10A and FIG. 10B are tables for showing the data structure of the optical correction data Dl for achieving the first embodiment with a structure different from those of the FIG. 9A to FIG. 9D.

FIG. 10A has the same structure as that of FIG. 8A except that the column of Ix is added.

FIG. 10B has the same structure as that of FIG. 8B. However, while in FIG. 8B, the division points to be formed on the optical correction data Do are determined by sequentially thinning out a division point from the optical correction data Dl, FIG. 10B is different from FIG. 8B in that the division points to be formed are freely determined for each type of the optical correction data Dc. For example, as shown in FIG. 10B, the n-th order coefficient Pn of the aberration quantity calculation formula at the division point Ix that does not exist on Dc1 and Dc3 is formed at a division point on Dc2 written in the column of Pn.

The lens optical correction data memory 108 retains the numerical tables of FIG. 10A and FIG. 10B as the optical correction data Dl. Further, the optical correction data determiner 109 determines the optical correction data Dc that satisfies the data size of the optical correction data Dc based on the camera apparatus 11 and the numerical table of FIG. 10B, and determines the optical correction data Dc from the division points written in the column of Pn and FIG. 10A.

For example, Dc2 indicated by the hatched portion of FIG. 10B is selected when the optical correction data determiner 109 determines that the camera apparatus 11 can support the optical correction data having a data size equal to or larger than such a data size that Fnum, Znum, and Inum being the numbers of division are 2, 3, and 3, respectively. At this time, as written in the column of Pn, the n-th order coefficient Pn of the aberration quantity calculation formula and the division points formed on the optical correction data Dc2 have the values included in the hatched portion of FIG. 10A.

As shown in the numerical table structure of FIG. 10A and FIG. 10B, as compared to the data structure of the related-art optical correction data Dl shown in FIG. 8A and FIG. 8B, the degree of freedom in n-th order coefficient Pn of the aberration quantity calculation formula becomes larger through the setting of a new iris division point Ix. In short, it is possible to determine the optical correction data Dc that enables the chromatic aberration of magnification to be corrected with higher accuracy. In addition, as compared to the numerical table shown in FIG. 9A to FIG. 9D, it is not required to retain a plurality of common n-th order coefficients Pn of the aberration quantity calculation formula, and hence it is possible to reduce the data amount to a level lower than in the case of the method of FIG. 9A to FIG. 9D for achieving the first embodiment.

As described above, according to the first embodiment, while reducing the size of the optical correction data, it is possible to determine optimum optical correction data by the lens unit 10 even with a limited size of the optical correction data, and to correct image degradation with high accuracy.

The optical correction of the chromatic aberration of magnification has been described above. In this regard, the optical correction can be applied even to a distortion and peripheral darkening through use of the optical correction data of the same type. When the magnification chromatic aberration quantity Er shown in FIG. 7 is applied to the distortion, the vertical axis may be regarded as a distortion quantity, and when the magnification chromatic aberration quantity is applied to the peripheral darkening, the vertical axis may be regarded as a darkening quantity.

Further, the first embodiment has been described by taking an exemplary case in which such tables of the n-th order coefficients Pn of the aberration quantity calculation formula as shown in FIG. 9A to FIG. 9D, FIG. 10A, and FIG. 10B are used as the optical correction data Dl stored in the lens optical correction data memory 108. However, the present invention is not limited thereto. For example, the lens optical correction data memory 108 may store the values of the optical characteristics at the plurality of positions of the focus lens position, the zoom lens position, and the iris position (at least one optical parameter) as the basic data to be used for the determination performed by the optical correction data determiner 109.

Second Embodiment

Now, a second embodiment of the present invention is described with reference to FIG. 11.

The second embodiment is different from the first embodiment in that the optical correction data Dc for a camera apparatus 21 is determined by the camera apparatus 21 instead of being determined by the lens unit 10.

Figure 11:
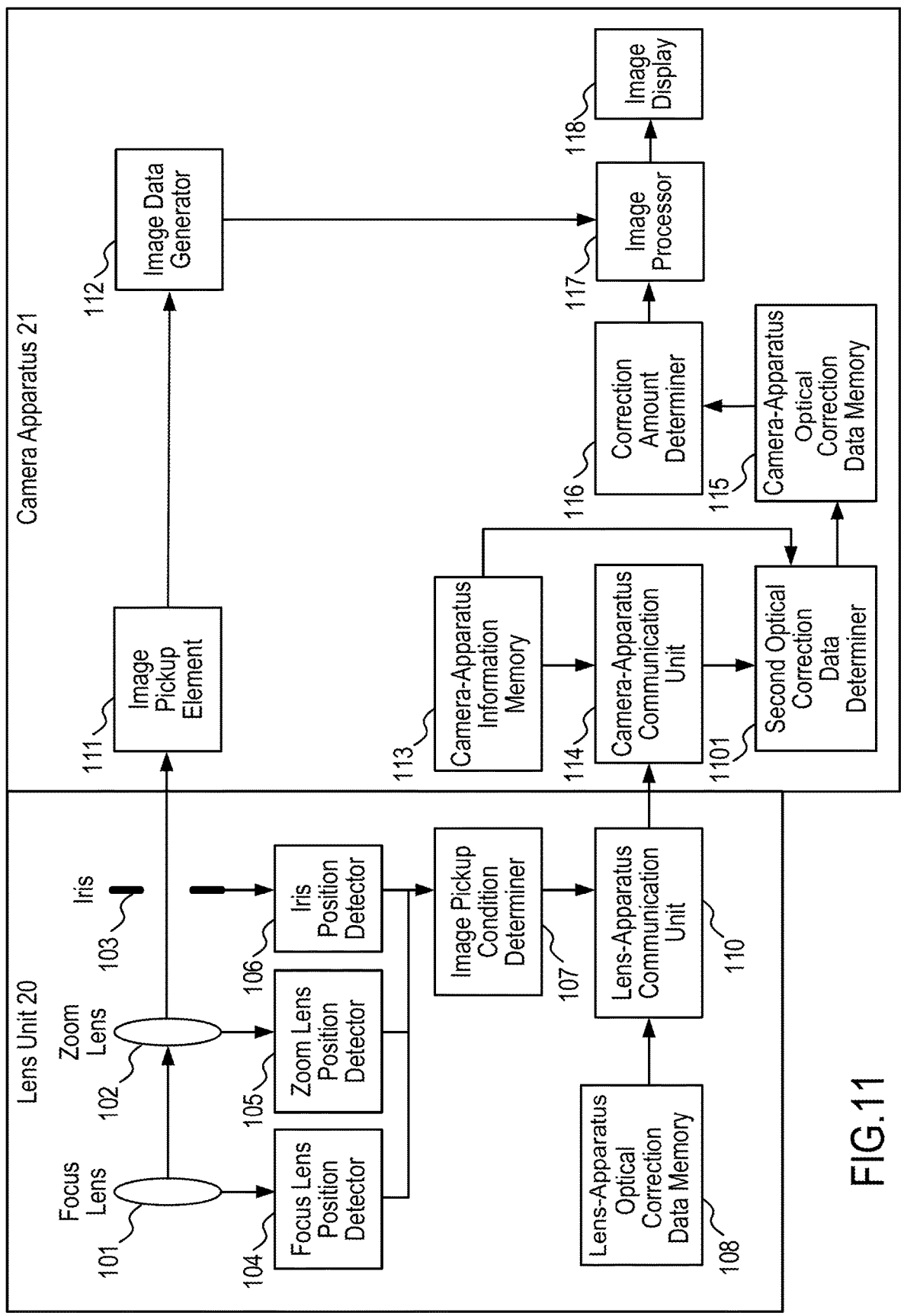
FIG. 11 is a configuration block diagram in a second embodiment of the present invention.

FIG. 11 a configuration block diagram of the second embodiment, in which the same components as those of the first embodiment are denoted by the same reference symbols, and the descriptions thereof are omitted.

In FIG. 11, only a lens unit 20, the camera apparatus 21, and a second optical correction data determiner 1101 are different from the equivalent components illustrated in FIG. 1.

The lens unit 20 is different from the lens unit 10 of FIG. 1 in that the optical correction data determiner 109 is not provided, and the optical correction data Dl of the lens optical correction data memory 108 is sent to the camera apparatus 21 via the lens-apparatus communication unit 110 as it is.

The camera apparatus 21 is different from the camera apparatus 11 of FIG. 1 in that the second optical correction data determiner 1101 is added.

The second optical correction data determiner 1101 determines the optical correction data Dc based on the optical correction data Dl received from the lens unit 20.

In the second embodiment, light that has entered the lens unit 20 is output as an image subjected to optical correction in accordance with the same flow as that of the first embodiment.

Next, a series of processing steps performed on the camera apparatus 21 side, in which the correction amount determiner 116 determines the optical correction amount Rr, is described with reference to FIG. 12. Processing performed on the lens unit 20 side is described later.

The series of processing steps performed on the camera apparatus 21 side, in which the correction amount determiner 116 determines the optical correction amount Rr, differs from that of the first embodiment illustrated in FIG. 2 in that the second optical correction data determiner 1101 determines the optical correction data Dc. In FIG. 12, the same processing steps as those of FIG. 2 are denoted by the same reference symbols, and the descriptions thereof are omitted.

When the procedure advances from Step S201 to Step S1201, the camera apparatus 21 receives the optical correction data Dl from the lens unit 20, and the procedure advances to Step S1202.

When the procedure advances to Step S1202, the second optical correction data determiner 1101 determines the optical correction data Dc based on the camera information retained by the camera information memory 113 and the optical correction data Dl received from the lens unit 20, and the procedure advances to Step S1203. In this case, the method of determining the optical correction data Dc based on the camera information and the optical correction data Dl by the second optical correction data determiner 1101 can be achieved by the same method as the method performed by the optical correction data determiner 109 in the first embodiment.

When the procedure advances to Step S1203, the camera apparatus 21 retains the optical correction data Dc determined by the second optical correction data determiner 1101 in the camera optical correction data memory 115, and the procedure advances to Step S205.

When the procedure advances to Step S205, the same processing steps as those of FIG. 2 are performed in the subsequent steps except for the difference between the lens unit 10 and the camera apparatus 11 of FIG. 1 and the lens unit 20 and the camera apparatus 21 of FIG. 11.

In the above-mentioned manner, it is possible to continue to determine the optical correction amount Rr to be applied to the image data before optical correction on the camera apparatus 21.

Figure 12:
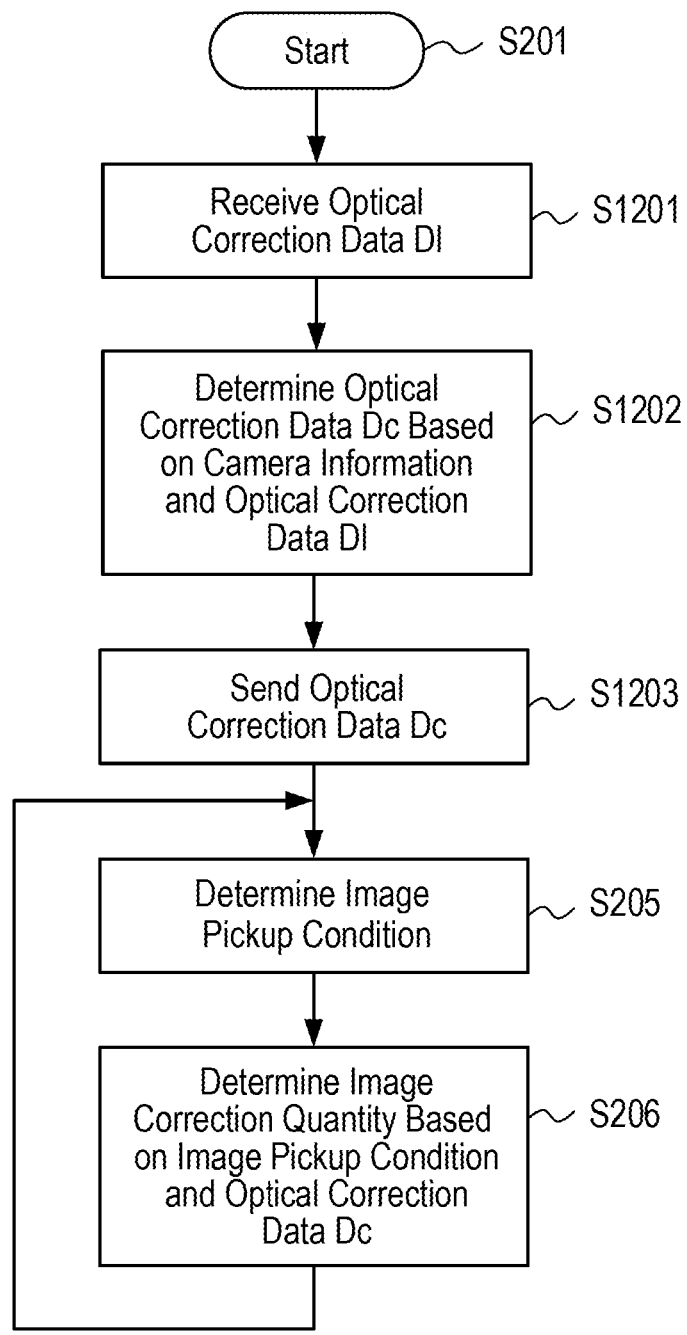
FIG. 12 is an operation flow chart of a camera apparatus 21 according to the second embodiment.

Next, a series of processing steps performed on the lens unit 20 side with respect to the processing of FIG. 12 is described with reference to FIG. 13.

Figure 13:
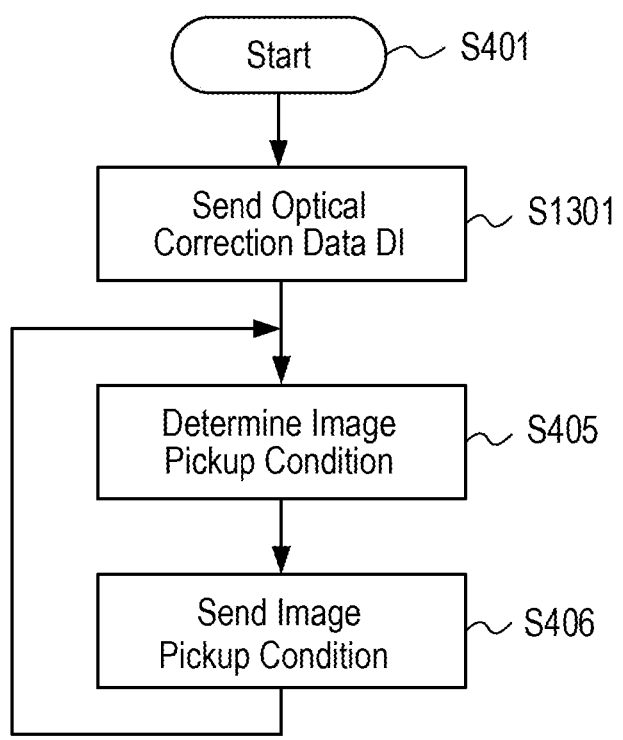
FIG. 13 is an operation flow chart of a lens unit 20 in the second embodiment.

FIG. 13 is an illustration of the flow of the series of processing steps performed on the lens unit 20 side with respect to the processing of FIG. 12 in the second embodiment.

FIG. 13 is different from FIG. 4 only in that, due to the absence of the optical correction data determiner 109, the optical correction data Dl is sent to the camera apparatus 21 as it is. In FIG. 13, the same processing steps as those of FIG. 4 are denoted by the same reference symbols, and the descriptions thereof are omitted.

When the procedure advances from Step S401 to Step S1301, the lens unit 20 sends the optical correction data Dl to the camera apparatus 21, and the procedure advances to Step S405.

When the procedure advances to Step S405, the same processing steps as those of FIG. 4 are performed in the subsequent steps except for the difference between the lens unit 10 and the camera apparatus 11 of FIG. 1 and the lens unit 20 and the camera apparatus 21 of FIG. 1.

After that, Step S405 and Step S406 are successively executed, to thereby be able to continue to send the image pickup condition, which is required for the calculation of the optical correction amount Rr to be applied, to the camera apparatus 11.

As described above, according to the second embodiment, while reducing the size of the optical correction data, it is possible to determine optimum optical correction data by the camera apparatus 21 even with a limited size of the optical correction data, and to correct image degradation with high accuracy.

The optical correction of the chromatic aberration of magnification has been described above. In this regard, the optical correction can be applied even to a distortion and peripheral darkening through use of the optical correction data of the same type in the same manner as in the first embodiment.

Third Embodiment

Now, a third embodiment of the present invention is described with reference to FIG. 14.

In a configuration of the third embodiment, an adaptor unit 31 is arranged between the camera apparatus 11 according to the first embodiment and the lens unit (lens apparatus and optical system) 20 of the second embodiment.

Figure 14:
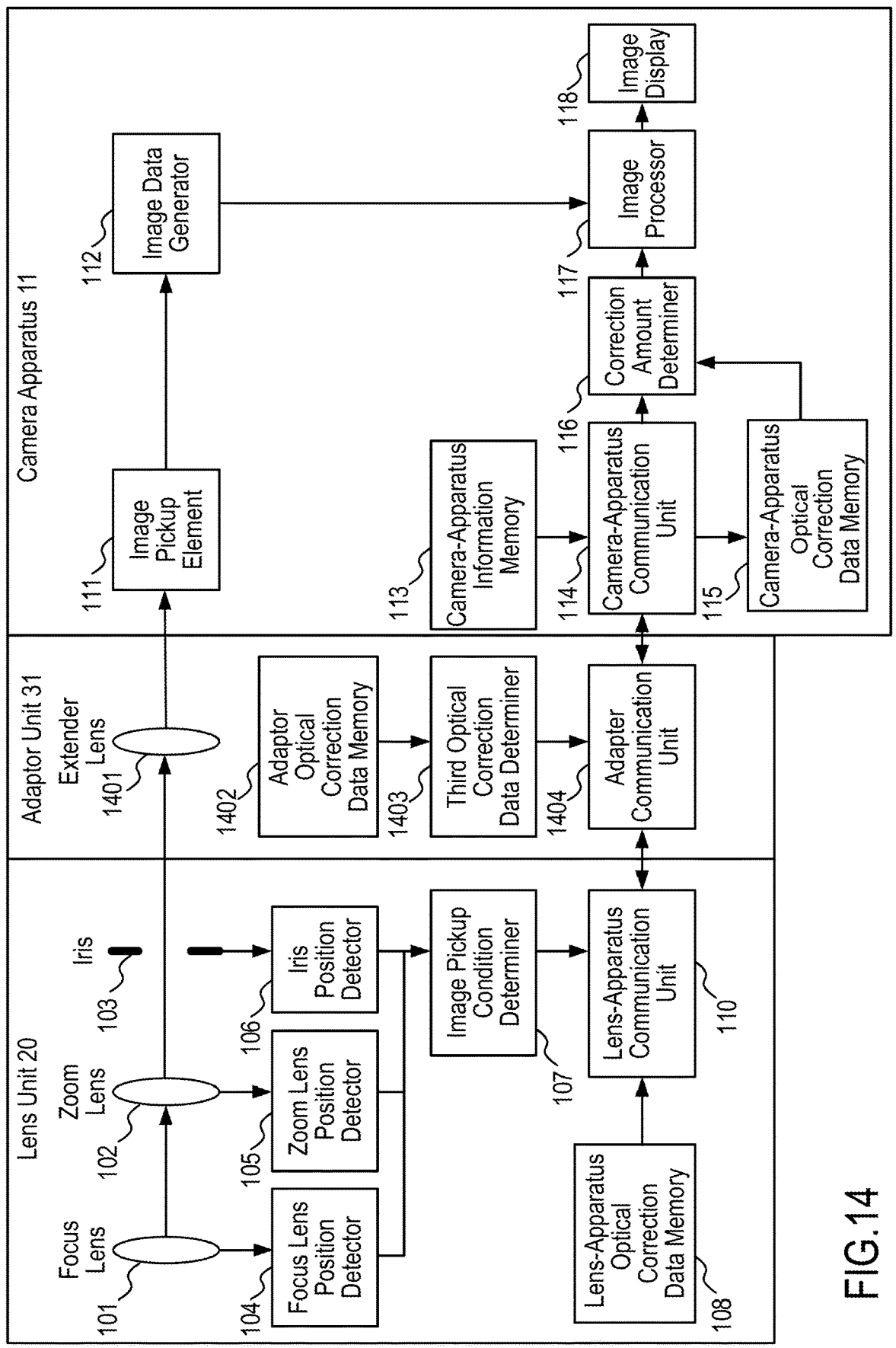
FIG. 14 is a configuration block diagram in a third embodiment of the present invention.

FIG. 14 a configuration block diagram of the third embodiment, in which the same components as those of the first and second embodiments are denoted by the same reference symbols, and the descriptions thereof are omitted.

An extender lens (adaptor optical apparatus) 1401 is a lens for enlarging light that has entered from the lens unit 20 to a fixed magnification. An adaptor optical correction data memory 1402 is a data memory configured to retain optical correction data (basic data) Da to be used for calculating a magnification chromatic aberration quantity ascribable to the optical characteristics of the extender lens 1401. The adaptor optical correction data memory 1402 is formed of a non-volatile memory, for example, a flash ROM memory. In this case, the optical correction data Da is data to be used for calculating a magnification chromatic aberration quantity enough to cause image degradation ascribable to the optical characteristics of the extender lens 1401. A third optical correction data determiner 1403 is an optical correction data determiner configured to determine the optical correction data Dc to be sent to the camera apparatus 11 in accordance with the camera information, the optical correction data Dl, and the optical correction data Da. An adaptor communication unit 1404 is a communication unit configured to communicate to/from the lens-apparatus communication unit 110 and the camera-apparatus communication unit 114.

The third optical correction data determiner 1403 and the adaptor communication unit 1404 are provided inside, for example, a CPU within the adaptor unit 31.

In the first embodiment, the optical correction data Dc is determined by the lens unit 10. Meanwhile, in the third embodiment, optical correction data Dca is determined by the adaptor unit 31. In this respect, the first embodiment and the third embodiment are different from each other. In this case, the camera apparatus 11 performs the same operation irrespective of which of the optical correction data Dc and the optical correction data Dca is determined.

In the third embodiment, the light that has entered the lens unit 20 passes through the extender lens 1401 to be imaged on the image pickup element 111. After the light is imaged on the image pickup element 111, the light is output as an image subjected to optical correction in accordance with the same flow as that of the first embodiment.

The series of processing steps in which the correction amount determiner 116 of the camera apparatus 11 determines the optical correction amount Rr is the same as that of the first embodiment except that the camera-apparatus communication unit 114 communicates to/from the adaptor communication unit 1404.

Further, the series of processing steps in which the lens unit 20 outputs the optical correction data Dl and the image pickup condition is the same as that of the second embodiment except that the lens-apparatus communication unit 110 communicates to/from the adaptor communication unit 1404.

Next, a series of processing steps performed by the adaptor unit 31 with respect to the processing performed on the camera apparatus 21 side, which is illustrated in FIG. 12, and the processing performed on the lens unit 10 side, which is illustrated in FIG. 4, is described with reference to FIG. 15.

Figure 15:
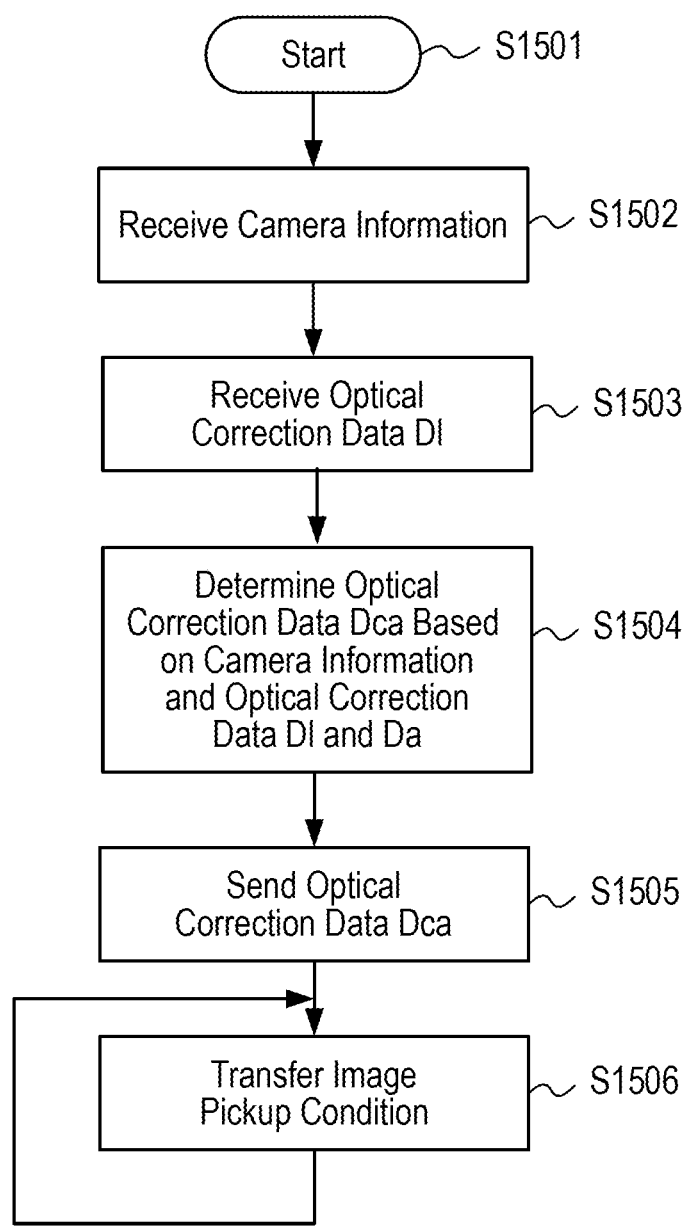
FIG. 15 is an operation flow chart of an adaptor unit 31 in the third embodiment.

FIG. 15 is an illustration of the flow of the series of processing steps performed on the adaptor unit 31 side in the third embodiment.

When the lens unit 20 and the adaptor unit 31 are connected to the camera apparatus 11 and the camera apparatus 11 is powered on, the procedure advances from Step S1501 to Step S1502 to start an operation of the third embodiment. In this case, the lens unit 20 and the adaptor unit 31 are configured to be supplied with power via a contact (not shown) with the camera apparatus 11, and hence, when the camera apparatus 11 is powered on, the lens unit 20 and the adaptor unit 31 are simultaneously supplied with power to be activated.

When the procedure advances to Step S1502, the adaptor communication unit 1404 receives the camera information sent from the camera apparatus 11 in Step S202, and the procedure advances to Step S1503.

When the procedure advances to Step S1503, the adaptor communication unit 1404 receives the optical correction data Dl from the lens unit 20, and the procedure advances to Step S1504.

When the procedure advances to Step S1504, the third optical correction data determiner 1403 determines the optical correction data Dca for the camera apparatus 11 based on the camera information received from Step S1502, the optical correction data Dl received in Step S1503, and the optical correction data Da, and the procedure advances to Step S1505. A method of determining the optical correction data Dca by the third optical correction data determiner 1403 is described later.

When the procedure advances to Step S1505 the third optical correction data determiner 1403 sends the determined optical correction data Dca to the camera apparatus 11 via the adaptor communication unit 1404, and the procedure advances to Step S1506.

When the procedure advances to Step S1506, the adaptor communication unit 1404 receives the current image pickup condition from the lens unit 20, and sends the received image pickup condition to the camera apparatus 11.

In the above-mentioned manner, the optical correction data Dca obtained by taking the lens unit 20 and the adaptor unit 31 into consideration and the current image pickup condition can be received by the camera apparatus 11, and the correction amount determiner 116 of the camera apparatus 11 can determine the optical correction amount Rr.

Next, a method of determining the optical correction data Dca by the third optical correction data determiner 1403 is described.

A magnification chromatic aberration quantity enough to cause image degradation ascribable to the lens unit 20 is defined as a magnification chromatic aberration quantity Erl, a magnification chromatic aberration quantity enough to cause image degradation ascribable to the adaptor unit 31 is defined as a magnification chromatic aberration quantity Era, and the enlargement magnification of the extender lens 1401 is defined as X. In this case, the magnification chromatic aberration quantity Erl of light that has entered the camera apparatus 11 is increased X-fold as compared to a case in which the adaptor unit 31 is not mounted. Therefore, the magnification chromatic aberration quantity Er enough to cause image degradation ascribable to the lens unit 20 and the adaptor unit 31 is as expressed in Formula 2.

$$Er = (Erl \times X) + Era \quad (2)$$

Therefore, in accordance with Formula 1 and Formula 2, an m-th order coefficient Pm of the aberration quantity calculation formula for calculating the magnification chromatic aberration quantity Er under a specific image pickup condition is as expressed in Formula 3. In Formula 3, m represents a freely-set numerical value, and Pml and Pma represent m-th order coefficients of the aberration quantity calculation formula for the specific image pickup condition on the optical correction data Dl and the optical correction data Da, respectively.

The third embodiment is described by taking a case in which Pma is a unique value that does not change depending on the image pickup condition, but Pma may be changed depending on the image pickup condition.

$$Pm = (Pml \times X) + Pma \quad (3)$$

Therefore, the third optical correction data determiner 1403 uniquely determines optical correction data Dcab being the source of the optical correction data Dca by Formula 3 from the optical correction data Dl and the optical correction data Da.

In addition, the third optical correction data determiner 1403 determines the optical correction data Dca based on the camera information and the optical correction data Dcab by the same method as the method of determining the optical correction data Dc based on the camera information and the optical correction data Dl by the optical correction data determiner 109 in the first embodiment.

As described above, according to the third embodiment, while reducing the size of the optical correction data, it is possible to determine optimum optical correction data by the adaptor unit 31 even with a limited size of the optical correction data, and to correct image degradation with high accuracy.

In the third embodiment, the optimum optical correction data. Dca is determined by the adaptor unit 31. However, there may be employed a method of providing the camera apparatus 11 with processing equivalent to the processing performed by the third optical correction data determiner 1403 to determine the optical correction data Dca by the camera apparatus 11.

Further, there may be employed a method involving providing the camera apparatus 21 according to the second embodiment in place of the camera apparatus 11, and determining the optical correction data Dcab on the adaptor unit 31 side to determine the optical correction data Dca on the camera apparatus 21 side.

The optical correction of the chromatic aberration of magnification has been described above. In this regard, the optical correction can be applied even to a distortion and peripheral darkening through use of the optical correction data of the same type in the same manner as in the first embodiment. Further, the present invention can be applied to a displacement amount of a focus position from the image pickup surface of the image pickup element along an optical axis direction. In this case, when information indicating which position within the picked-up image is to be focused is identified in the camera apparatus, the present invention is applied to control for correcting the focus lens position by a required correction amount corresponding to the displacement amount of the focus position at the identified position.

The exemplary embodiments of the present invention are described above, but the present invention is not limited to those embodiments and can be modified and changed variously within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-083565, filed Apr. 20, 2017, which is hereby incorporated by reference herein in its entirety.

What is claimed is:

1. An output apparatus configured to output correction information on combinations each of which is a combination of a value of a parameter of an optical system and correction data corresponding to the value, the optical system forming an image to be picked up by a camera apparatus, the correction data being used for obtaining, by interpolation of the correction data, a correction amount regarding an optical characteristic of the optical system for correcting the image, the output apparatus comprising:

a memory; and a processor configured to determine the correction information based on information regarding the camera apparatus, wherein the processor is configured to determine, letting M and N be positive integers that satisfy M<N, first correction information in a case where a number of the combinations is M so as to include information on a combination of the value and the correction data that is not included in all combinations of second correction information in a case where a number of the combinations is N, the first correction information being higher in accuracy of the interpolation than third correction information in a case where a number of the combinations is M and the M combinations are included in the all combinations, and wherein the memory stores the first and second correction information.

2. The output apparatus according to claim 1, wherein the processor is configured to determine the first correction information to minimize a maximum value of differences each of which is a difference between the correction amount obtained based on the first correction information and the correction amount obtained based on the second correction information.

3. The output apparatus according to claim 1, wherein the information regarding the camera apparatus relates to a size of data acceptable by the camera apparatus.

4. The output apparatus according to claim 1, wherein the processor is configured to determine the first correction information based on a table including information on the combinations.

5. A lens apparatus comprising:
an output apparatus of claim 1; and
the optical system.

6. An image pickup apparatus comprising:
a lens apparatus according to claim 5; and
the camera apparatus.

7. An adaptor apparatus arranged between a lens apparatus and a camera apparatus, the adaptor apparatus comprising:
an output apparatus of claim 1,
wherein the optical system includes the adaptor apparatus and the lens apparatus.

8. An image pickup apparatus comprising:
an adaptor apparatus according to claim 7; and
the camera apparatus.

9. A camera apparatus comprising:
an output apparatus of claim 1.

10. An image pickup apparatus comprising:
a camera apparatus according to claim 9; and
a lens apparatus including the optical system.

11. A camera apparatus according to claim 9, wherein:
the first and second correction information includes a coefficient of a formula for obtaining data corresponding to an aberration quantity with respect to an image height, and
the processor is configured to correct data of the image based on the coefficient.

12. An output apparatus configured to output correction information on combinations each of which is a combination of a value of a parameter of an optical system and correction data corresponding to the value, the optical system forming an image to be picked up by a camera apparatus, the correction data being used for obtaining, via interpolation of the correction data, a correction amount regarding an optical characteristic of the optical system for correcting the image, the output apparatus comprising:
a processor configured to determine, as the correction information, first correction information based on information regarding the camera apparatus,
wherein letting M and N be positive integers that satisfy M<N, the first correction information whose number of the combinations is M includes information on a combination of the value and the correction data that is not included in all combinations of second correction information whose number of the combinations is N, the first correction information being higher in accuracy of the interpolation than third correction information whose number of the combinations is M and the M combinations are included in the all combinations.

13. The output apparatus according to claim 12, further comprising a memory storing the second correction information.

14. The output apparatus according to claim 12, further comprising a memory storing the first and second correction information.

15. The output apparatus according to claim 14, wherein the memory stores the first and second correction information without duplication of information on the combination common therebetween.

16. The output apparatus according to claim 12, wherein the first correction information is information obtained to minimize a maximum value of differences each of which is a difference between the correction amount obtained based on the first correction information and the correction amount obtained based on the second correction information.

17. The output apparatus according to claim 12, wherein the parameter relates to at least one of a position of a lens for zooming included in the optical system, a position of a lens for focusing included in the optical system, or a state of an aperture stop included in the optical system.

18. The output apparatus according to claim 12, wherein:
the optical system includes a lens apparatus and an adaptor apparatus arranged between the lens apparatus and the camera apparatus, and
the processor is configured to determine the first correction information based on a magnification of the adaptor apparatus.

19. The output apparatus according to claim 12, wherein the information regarding the camera apparatus relates to a size of data acceptable by the camera apparatus.

20. The output apparatus according to claim 12, wherein the information regarding the camera apparatus relates to one of a permissible circle of confusion of the camera apparatus, a size of an image pickup element included in the camera apparatus, or a number of effective pixels of the image pickup element.

21. The output apparatus according to claim 12, wherein the optical characteristic relates to one of a chromatic aberration of magnification, distortion, peripheral darkening, or a focus position.

22. The output apparatus according to claim 12, wherein the processor is configured to determine the first correction information based on a table including information on the combinations.

23. The output apparatus according to claim 12, wherein the processor is configured to determine the first correction information based on data indicating information on the combinations.

24. A camera apparatus comprising:
an output apparatus of claim 12.

25. An image pickup apparatus comprising:
a camera apparatus according to claim 24; and
a lens apparatus including the optical system.

26. A camera apparatus according to claim 24, wherein:
each of the first and second correction information includes a coefficient of a formula used for obtaining the correction amount, and
the processor is configured to correct data of the image based on the coefficient.

27. A lens apparatus comprising:
an optical system configured to form an image to be picked up by a camera apparatus; and
an output apparatus configured to output correction information on combinations each of which is a combination of a value of a parameter of the optical system and correction data corresponding to the value, the correction data being used for obtaining, by interpolation of the correction data, a correction amount regarding an optical characteristic of the optical system for correcting the image, the output apparatus comprising:
a processor configured to determine, as the correction information, first correction information based on information regarding the camera apparatus,
wherein letting M and N be positive integers that satisfy M<N, the first correction information whose number of the combinations is M includes information on a combination of the value and the correction data that is not included in all combinations of second correction information whose number of the combinations is N, the first correction information being higher in accuracy of the interpolation than third correction information whose number of the combinations is M and the M combinations are included in the all combinations.

28. An image pickup apparatus comprising:
a lens apparatus according to claim 27; and the camera apparatus.

29. An adaptor apparatus arranged between a lens apparatus and a camera apparatus, the adaptor apparatus comprising:
an output apparatus configured to output correction information on combinations each of which is a combination of a value of a parameter of an optical system and correction data corresponding to the value, the correction data being used for obtaining, by interpolation of the correction data, a correction amount regarding an optical characteristic of the optical system for correcting the image, the output apparatus comprising:
a processor configured to determine, as the correction information, first correction information based on information regarding the camera apparatus,
wherein letting M and N be positive integers that satisfy M<N, the first correction information whose number of the combinations is M includes information on a combination of the value and the correction data that is not included in all combinations of second correction information whose number of the combinations is N, the first correction information being higher in accuracy of the interpolation than third correction information whose number of the combinations is M and the M combinations are included in the all combinations,
wherein the optical system includes the adaptor apparatus and the lens apparatus.

30. An image pickup apparatus comprising:
an adaptor apparatus according to claim 29; and
the camera apparatus.

* * * * *